Patented July 13, 1954

2,683,695

UNITED STATES PATENT OFFICE 2,683,695

REGENERATION OF CATION EXCHANGERS CONTAINING ALKALINE EARTH METALS

Russell N. Dwyer, Needham, and Verity C. Smith, West Roxbury, Mass., assignors to Barnstead Still and Sterilizer Co., Jamaica Plain, Mass., a corporation of Massachusetts No Drawing. Application June 27, 1952, Serial No. 296,062

6 Claims. (Cl. 260—2.2)

This invention relates to ion-exchange and in particular to the regeneration of cation-exchange materials to the hydrogen form from the alkaline earth metal form. A primary object of this invention is to utilize a regenerant chemical which is chiefly sulfuric acid, without causing the precipitation of insoluble alkaline earth sulfates within the bed of cation exchange material.

Ion-exchange processes are frequently used to treat aqueous solutions that contain undesirably high concentrations of alkaline earth metal salts to remove the alkaline earth metal cations and replace them with other cations, often hydrogen. The mechanism of this process is the exchange of cations in the ion-exchange material for cations in the water being treated. For the removal of alkali earth metals and the replacement of them in solution with hydrogen ions, an ion-exchange material in the hydrogen form, that is, a solid water-insoluble cation exchange material having fixed negative charges and positive mobile hydrogen ions associated with the negative charges, would be used. On contacting such a material with water containing alkaline earth metal ions, hydrogen ions from the ion-exchange material are replaced by alkaline earth metal ions until the ion-exchange capacity of the ion-exchange material is substantially exhausted. In order to treat more water with this material and continue the process, it is necessary to regenerate the ion-exchanger by treating it with an acid to replace the alkaline earth metal cations on the ion-exchange material wih hydrogen ions from the acid. It is obviously desirable from an economic point of view to use sulfuric acid as the source of hydrogen ions, but it has been found that in contacting a cation-exchange material in the alkaline earth metal form with sulfuric acid, there results the formation of insoluble alkaline earth metal sulfate which coats the granular particles of the ion-exchange material, thus impairing its ion-exchange capacity, and which also clogs the beds of the ion-exchanger to render the passage of fluids through them increasingly difficult.

A number of schemes have been proposed to make it possible to use sulfuric acid to regenerate cation-exchanger in the alkaline earth metal form. One proposal is to use a very dilute sulfuric acid in the hope that insoluble sulfate salts will not precipitate. It has been found, however, that even with very dilute solutions of sulfuric acid as the regenerant chemical, insoluble sulfates do form in the bed on prolonged cyclical operation. Another scheme proposed to regenerate an ion-exchanger in the alkaline earth metal form, makes use of a pre-treatment of the exhausted exchanger with sodium chloride solution to convert the exchanger from the alkaline earth metal form to the sodium form. The exchanger is then regenerated with sulfuric acid with less danger of the formation of insoluble sulfates. A disadvantage of this technique is that it is a two-step process that requires additional regenerant chemical as well as additional regenerant water. It has also been found that it is difficult to remove all alkaline earth metals by this technique and that insoluble sulfates do tend to form in the bed after prolonged cyclical operation.

The present invention provides a method of regenerating a cation exchanger in the alkaline earth metal form by means of regenerating chemicals consisting chiefly of sulfuric acid directly in a one-step process while greatly reducing the formation of insoluble sulfates. It has been found that sulfuric acid may be used in ordinary regenerating strength to regenerate a cation exchanger that has been exhausted in treating aqueous solutions containing alkaline earth metals such as calcium, if a small amount of nitric acid is first mixed with the sulfuric. As little as 5% nitric acid (based on total acids present in the regenerant) in a regenerating solution containing up to about 15% total acid has been found effective to regenerate a cation exchanger containing substantial calcium, without the formation of insoluble calcium sulfate either in the bed or in the effluent regenerant. Even after prolonged cyclical operation, there is no apparent clogging of the bed nor serious loss of its ion-exchange capacity.

The process of this invention is applicable to the regeneration of all known cation-exchange materials commonly used industrially for hydrogen exchange. Included are the sulfonated humic compounds for instance, such as those described in U. S. Patent Numbers 2,191,063; 2,205,635; 2,191,060; 2,206,007; the condensation polymers of phenols, polyhydric phenols and sulfonated phenols with formaldehyde or other aldehydes, such as those described in U. S. Patent Numbers 2,448,029; 2,204,539; 2,191,853; 2,104,501; 2,230,641; 2,361,754; 2,228,159; 2,228,160; and the sulfonated copolymers of monovinyl aryl compounds and polyvinyl aryl compounds, for instance, a sulfonated copolymer of styrene and divinyl benzene and similar compounds described in U. S. Patent Numbers 2,366,007 and 2,500,149.

Preferred utilization of the present invention is in the treatment of aqueous solutions containing greater than about 300 parts per million (p. p. m.)

of calcium (expressed as equivalent calcium carbonate). At lower concentrations, sulfuric acid alone, without the addition of nitric acid, may be used effectively in ordinary regenerating strength (about 5–15% by weight), and the improvement resulting by adding nitric acid is only slight. When greater amounts of calcium are present in the water being treated, however, a regenerant solution containing only sulfuric acid results in appreciable calcium sulfate precipitation. Under such conditions the addition of nitric acid to the regenerant in accordance with this invention is advantageous.

The amount of nitric acid that should be included in the regenerant depends generally on the concentration of calcium in the solution being treated, and on the ratio of calcium to other cations in the solution. At a calcium concentration of about 300 parts per million (p. p. m.) (expressed as equivalent calcium carbonate), with or without additional cations, about 5 per cent nitric acid, by weight based on total acid in a regenerant of ordinary regenerating strength is effective to enhance the regenerated capacity of the bed and prevent precipitation of calcium sulfate. At 500 parts per million (p. p. m.) of Ca, a definite improvement in the regenerated capacity of the bed is observed with 10 per cent nitric acid, by weight based on total acid, but best results are attained when 20–25 per cent nitric acid is incorporated in a solution containing between about 5 and 15 per cent by weight of total acid. The effect of the presence of other cations, e. g. alkali metal cations, in the water being treated for calcium removal is to reduce the amount of nitric acid necessary to prevent calcium sulfate precipitation. For instance, in treating a natural water containing about 500 p. p. m. of calcium, 580 p. p. m. of sodium and 50 p. p. m. of magnesium (all expressed as equivalent calcium carbonate), markedly improved results were obtained with a regenerant solution containing only 5 per cent nitric acid (by weight based on total acid) in a regenerant solution of ordinary regenerating strength.

The following examples describe representative embodiments of this invention for purposes of illustration. The aqueous solutions treated for calcium removal were:

A. Calcium chloride 300 p. p. m. (expressed as equivalent calcium carbonate)
B. Calcium chloride 500 p. p. m. (expressed as equivalent calcium carbonate)
C. A natural brackish water containing:
    Calcium—500 p. p. m. (expressed as equivalent calcium carbonate)
    Sodium—577 p. p. m. (expressed as equivalent calcium carbonate)
    Magnesium—50 p. p. m. (expressed as equivalent calcium carbonate)

The aqueous regenerating solutions shown in Table I were used and compared:

*Table I.—Regenerating solutions*

| Designation | Total Acid, wt. Percent | $H_2SO_4$ Percent by wt. on Total Acid | $HNO_3$ Percent by wt. on Total Acid |
|---|---|---|---|
| I | 10 | 100 | 0 |
| II | 10 | 95 | 5 |
| III | 10 | 90 | 10 |
| IV | 10 | 85 | 15 |
| V | 10 | 80 | 20 |
| VI | 10 | 75 | 25 |

The procedure in each example was first to form a bed 3 inches in diameter and 20 inches in height of a sulfonated polystyrene type cation exchange resin, which was first regenerated with the regenerant solution to be tested by flowing the regenerant solution downward through the bed. The bed was then drained of residual acid, and the solution to be treated was flowed upward through the bed until the specific resistivity of the effluent after subsequent acid removal by conventional anion exchange dropped to 1000 ohm cm., at which point the bed was drained and the regenerant solution was again flowed downward therethrough. In each regeneration about 300 per cent of the theoretical amount of acid required for complete regeneration was used to assure complete regeneration. In several of the examples cyclical operation was performed by repeatedly passing the solution to be treated through the bed and regenerating it in the manner described above. Table II reports the volume (in liters) of solution treated to the end point of 1000 ohm cm. in each pass of solution through the bed, and whether a precipitation of calcium sulfate occurred during regeneration.

*Table II*

| | Solution Treated | Regenerant | Liters of solution treated to 1000 ohm-cm. end point | | | | |
|---|---|---|---|---|---|---|---|
| | | | Pass 1 | Pass 2 | Pass 3 | Pass 4 | Pass 5 |
| 1 | A | I | 142.5 | [1]161 | 141.3 | | |
| 2 | A | II | 145.7 | 156.6 | 143.1 | | |
| 3 | B | I | [1]133 | [1]61 | [1]54 | [1]36 | [1]40 |
| 4 | B | III | [1]128 | [1]66 | 58 | [1]40 | 44 |
| 5 | B | IV | [1]115 | [1]59 | [1]66 | 63 | 70 |
| 6 | B | V | [1]139 | [1]63 | [1]78 | 63 | 65 |
| 7 | B | VI | [1]108 | 86 | 76 | 75 | 78 |
| 8 | C | I | [1]70 | | | | |
| 9 | C | II | 89 | | | | |
| 10 | C | III | 80 | | | | |

[1] Precipitate formed during subsequent regeneration.

It will be observed from the foregoing data that in the treatment of water containing 300 p. p. m. of calcium (Examples 1 and 2) there was some tendency for calcium sulfate to precipitate when sulfuric acid alone was used for regeneration, and that this tendency was avoided when 5% nitric acid was included with sulfuric. When treating water containing 500 p. p. m. of calcium (Examples 3–7 incl.), a marked reduction in calcium sulfate precipitation was found when 15% nitric acid was included with the sulfuric, but best results were obtained with 25% nitric acid. With natural brackish water containing 500 p. p. m. of calcium and other dissolved cations (Examples 8–10 incl.) as little as 5 per cent nitric acid was found to be entirely effective to prevent the precipitation of calcium sulfate. Moreover, it will be seen that the process of this invention increases the amount of water that may be treated in each pass through the cation exchanger.

Having thus disclosed our invention and described in detail illustrative embodiments thereof, we claim and desire to secure by Letters Patent:

1. The method of regenerating a water-insoluble cation exchange material containing an insoluble-sulfate-forming alkaline earth metal to the hydrogen form comprising contacting said cation exchange material with a regenerating solution containing between about 5 and 15 per cent by weight of total acid, of which between about 75 and 95 per cent by weight is sulfuric acid and between about 5 and 25 per cent by weight is nitric acid.

2. The method defined by claim 1 wherein the alkaline earth metal is calcium.

3. In a process of treating water containing not less than about 300 p. p. m. of an insoluble-sulfate-forming alkaline earth metal (expressed as equivalent calcium carbonate) wherein the water is passed through a bed of a water insoluble cation exchange material in the hydrogen form, to replace cations in the water with hydrogen, the step of regenerating the cation exchange material to the hydrogen form comprising contacting the cation exchange material with a regenerating solution containing between about 5 and 15 per cent by weight of total acid, of which between about 75 and 95 per cent by weight is sulfuric acid and between about 5 and 25 per cent by weight is nitric acid.

4. The process defined in claim 3 wherein the alkaline earth metal is calcium.

5. The method of regenerating a cation exchange resin in the alkaline earth metal form comprising contacting said resin with a regenerant solution containing between about 5 and 15 per cent by weight of total acid of which a minor proportion in excess of 5% of the total acid is nitric acid and a major proportion of the total acid is sulfuric acid.

6. The method of regenerating a cation exchange resin in the calcium form to convert it to the hydrogen form comprising contacting the resin with a regenerant solution containing between about 5 and 15 per cent by weight of total acid of which a minor proportion in excess of 5 per cent of the total acid is nitric acid and a major proportion of the total acid is sulfuric acid.

References Cited in the file of this patent

UNITED STATES PATENTS

| Number | Name | Date |
| --- | --- | --- |
| 2,366,651 | Rawlings | Jan. 2, 1945 |
| 2,413,734 | Rawlings et al. | Jan. 7, 1947 |